(12) United States Patent
Bendert et al.

(10) Patent No.: US 6,275,867 B1
(45) Date of Patent: Aug. 14, 2001

(54) OPERATION-PARTITIONED OFF-LOADING OF OPERATIONS IN A DISTRIBUTED ENVIRONMENT

(75) Inventors: Edward Joseph Bendert, Vestal; Robert Bradley Bennett, Endwell; Eugene Johnson, Vestal; Robert Micheal Nugent, Nichols, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/527,148

(22) Filed: Sep. 12, 1995

(51) Int. Cl.[7] .................................................. G06F 9/54
(52) U.S. Cl. .............................................. 709/316
(58) Field of Search ........................ 395/680, 681, 395/682; 709/300, 301, 302, 1–108, 200–253, 310–332

(56) References Cited

U.S. PATENT DOCUMENTS

| | | | |
|---|---|---|---|
| 4,422,158 | 12/1983 | Galie | 707/5 |
| 4,825,354 | 4/1989 | Agrawall et al. | 707/10 |
| 4,887,204 | 12/1989 | Johnson et al. | 707/10 |
| 5,175,851 | 12/1992 | Johnson et al. | 707/8 |
| 5,287,453 | 2/1994 | Roberts | 709/201 |
| 5,303,375 | 4/1994 | Collins et al. | 709/100 |
| 5,305,440 | 4/1994 | Morgan et al. | 709/203 |
| 5,305,461 | 4/1994 | Feigenbaum et al. | 712/225 |
| 5,357,632 | * 10/1994 | Pian et al. | 709/105 |
| 5,434,852 | * 7/1995 | La Porta et al. | 370/385 |
| 5,539,883 | * 7/1996 | Allon et al. | 709/105 |
| 5,603,028 | * 2/1997 | Kitsuregawa et al. | 709/105 |
| 5,608,903 | * 3/1997 | Prasad et al. | 707/10 |
| 5,740,371 | * 4/1998 | Wallis | 709/229 |
| 5,835,755 | * 11/1998 | Stellwagen, Jr. | 707/3 |

* cited by examiner

Primary Examiner—St. John Courtenay, III
(74) Attorney, Agent, or Firm—Lawrence A. Maxham

(57) ABSTRACT

Selected server operations that affect objects in a distributed computing system can be off-loaded from servers at which the objects are stored to other servers without the requirement of vertical partitioning of the affected objects and without off-loading entire affected objects. A client environment process that requests an operation on an object is notified of a task server to which selected off-load operations should be sent. The client preferably stores the task server identifier and thereafter sends such operation request directly to the identified task server. The object metadata information can be stored in the client environment, if desired. The object metadata at the owning repository server is maintained, if affected by the requested operation. A single task server can perform off-loaded functions from several other repository servers at the same node and at other nodes, and in that way reduce the workload of many servers. The functions that can be off-loaded include named pipe functions and byte range file lock operations.

48 Claims, 6 Drawing Sheets

OPERATION-PARTITIONED OFF-LOADING OF OPERATIONS IN A DISTRIBUTED ENVIRONMENT

BACKGROUND OF THE INVENTION

1. Field of the Invention

This invention relates generally to distributed computer processing systems and, more particularly, to management of server operations in distributed processing systems.

2. Description of the Related Art

A distributed computer processing system comprises two or more nodes connected through a communication link called a network. A processing system can be placed at each node of the network and can include one or more computer machines having a central processing unit (CPU). It is desirable to permit a computer machine at one node of the network to gain access to data files located at a remote node of the network. The term "client" is generally used to refer to a processing system that might desire access to a data file and the term "server" is generally used to refer to the processing system at a node where a desired data file is located. Often, distributed computer processing systems include dedicated servers that have no function other than to satisfy data file access requests from clients at the same node or at different nodes of the system.

A data file is a named set of bytes or records that are stored and processed as a unit by a process. A process comprises a set of program instructions that can be stored in addressable program memory storage of a computer machine and loaded into CPU registers that cause the instructions to be executed. A process whose instructions are being executed is said to be running or to be current. A data file that is being accessed (and therefore is potentially being modified) by a process is said to be open. The data file is otherwise said to be closed. Each node of a distributed computer processing system includes one or more operating system processes that provide an operating environment in which program execution, data transfer, and interprocess communication can take place.

Generally, the available computer machine memory is insufficient to provide an actual memory location at which every program instruction and desired data file record can be stored. Multiple processes and the data files they utilize can share the adressable memory available to a computer machine by the concept of virtual storage, which exists relative to an addressable address space of the computer machine. Virtual storage defines an address space of a computer machine memory to comprise fictitious (or "virtual") memory locations at which program instructions and data files can be stored. Each virtual location of the address space is temporarily mapped onto an actual physical computer memory location that is used only while a process is running or a data file is open and actively using that portion of memory. When a process is not running or a data file is not open, it is stored in an auxiliary storage device, such as a disk drive.

Thus, the virtual storage address space is not limited by the actual number of memory locations of computer machine memory. Rather, virtual storage is limited only by the addressing scheme of a computer machine and the amount of auxiliary storage available. As a result, a distributed computer processing system can include a vast number of processes being executed in an essentially simultaneous fashion. Such concurrent processes can request data file access from servers at a very high rate.

To facilitate communication between the various processes and network users, the distributed computer processing system typically provides an operating environment that includes pipes. Pipes are data structures that are used by processes to provide a means of storing data on a first-in-first-out (FIFO) basis so the data can be shared among the processes of an operating system. That is, a portion of a running user process (also called an application program) creates output data that it writes to a pipe and another portion of the same, or a different, user process reads the data from the pipe. Pipes permit processes to read and write data to and from some shared media, such as a common server memory, and permit such data to be shared with other processes. The operating system that supports such pipes typically includes read-write synchronization features to provide orderly read and write activity between processes. For example, a process might wait for a pipe write operation to occur before reading from the pipe.

Many operating systems for distributed system application support both named pipes and unnamed pipes. Unnamed pipes typically are implemented through storage queues or memory buffers to support local, tightly coupled communications within a processing system at a single network node. Named pipes typically are implemented as defined data objects in that they comprise object names with which data can be associated. The object names provide a reference for processes and therefore named pipes can support more flexibly coupled communications with more distant, remote network recipients.

Two or more processes communicate with named pipes by agreeing on a pipe name, defining a pipe by that name, and eventually opening a pipe having that defined name. As each process carries out such opens, as well as subsequent pipe reads and writes, the pipe operations are coordinated by the pipe server such that the pipe operations are synchronized between the participating processes. This synchronization through a named pipe data object, and passing of pipe data through the mutually opened named pipe data object, allows effective inter-process communications. This synchronized communication is entirely based on the selection of a name known by the participating application processes and the definition of a pipe by that name in a common server repository at a network node.

It is not necessary nor desirable that the pipe server permanently store the pipe data as it would file data. Pipe data is transitory and typically is simply stored in server memory only while the named pipe is open. When all instances of one particular named pipe are closed, the associated data is discarded. That is, memory for holding the pipe data and its status can be freed. This is different from normal file data, which is retained in permanent storage (such as occurs when data is written to a direct access storage device (DASD), including disk drives and the like).

Despite the difference between data files and named pipes relative to the permanent storage of data, they do have in common the concepts of:

1. being named objects, which are objects that are defined in a server where processes can share them and are objects that require permanent storage of information about the object definition (called metadata) in the server repository; and
2. allowing a set of functional operations, including open, write, read, and close operations, by processes that share these objects.

Named pipe operations typically involve transfer of relatively small amounts of data that are necessary to support data file read and write activities. For example, a pipe might be used to communicate the name and storage address location of a data file to be used by a process. The transfer of such a small amount of data consumes almost as much in the way of system resources for each pipe read or write operation as larger data transfer operations of the server. Thus, pipe operations can interface with primary data file transfer and handling operations of a server and can thereby adversely affect server efficiency.

System performance can be improved by storing information about objects, such as data files, within a local cache of a processing system at a client node, or at least in local cache of a network node relatively close to the client node. The second data can include not just information about data objects but also can include the data objects themselves. Such a scheme is called local data object caching.

Local data object caching can be very effective in minimizing server communications from the server at which a data object is stored, called the owning server. Local caching, however, still can eventually require processing of cached data objects by the owning server when the scope of a reference to a cached object exceeds the bounds of the cached location. Thus, server processing is often not reduced through local data object caching. In fact, server processing can be increased when the requirement of managing what is being locally cached is considered. In this way, the local cache can provide the benefit of reducing end user reference time but does not necessarily reduce server resource loads imposed from caching operations.

System performance also can be improved by moving some tasks from the owning sever to another server, thereby preventing excessive loading of resources at a single server. For example, one server might be assigned to perform all operations relating to a particular group of files and another server might be assigned to perform all operations relating to another group of files. Such a scheme could be referred to as "vertical partitioning" because the responsibility for operations on a list of files is divided among servers. Generally, vertical partitioning is used to store data objects in a repository that is available to all users in a distributed system, but in a relatively optimal storage device location (such as a disk drive location) relative to the most common expected users of the data objects.

A type of operational partitioning, or operational off-loading, occurs when one or more particular, self-contained server tasks are delegated from an originating server to another server or process to minimize the operating load on the originating server. For example, input/output spooling is an example of server operational off-loading in which a printing task, which includes parallel execution of several elements of a complex algorithm, is given to a process that implements printing output data without further end-user interaction or involvement.

More particularly, input/output spooling creates a process that receives data records to be transferred from an originating process to another. For example, if a data file is to be printed at a network printer, an output spooling process at a network node processing machine receives the data file from an originating server and independently completes the operating steps necessary to ensure that the data file is printed. It is not necessary for named pipe processes to be created at the originating server to handle the printing operation. Rather, in accordance with output spooling, pipe processes will be automatically created at the implementing server. The originating server is free to execute other tasks after it has sent the data file to the server owning the output spooling process. Spooling is an example of a method of operational off-loading that is made possible by the independent nature of the function that is performed. There is no dependence of the spooling operation on the server repository object definitions.

Vertical partitioning entails off-loading object definitional information (that is, metadata) as well as off-loading the responsibility for permanently storing information such as file data. In contrast, operational partitioning entails off-loading only the execution of specific operations (without moving object definitions to another server). There remains a class of operations and objects where off-loading is required, but:

1. there is dependence on object definition information by the object operations (unlike spooling operations), and
2. it is not practical to permanently off-load the object definition (metadata) along with the currently requested operations on that object.

The reason for the latter impracticality is that such object definitions generally have a defined hierarchical affinity with other objects in the repository. A named part, for example, is typically created (defined) in a directory along with other applications objects that are not necessarily pipes. It is not practical for a server to unilaterally off-load such an object definition to another server without consulting the owning client and it would not be practical to off-load such a pipe object without also off-loading other objects in the same hierarchical directory to which the pipe object has been associated by the owning client.

Off-loading of byte range locking operations to another server is yet another example of operational off-loading where there is a dependence on object definitions and where it is not practical to apply a vertical partitioning method. The reasons for the latter impracticality are the same as for named pipes.

From the discussion above, it should be apparent that there is a need for a distributed computer processing system that permits server task off-loading independently of vertical partitioning of data repositories, thereby reducing server task loading for a greater number of data object types. The present invention satisfies this need.

SUMMARY OF THE INVENTION

In accordance with the invention, a set of resource-consuming operations on objects in a distributed computer processing system if off-loaded from the sever at which the objects are stored, called the repository server, to a secondary server, called a task server, without relocating the affected objects. That is, the operations are off-loaded in the sense that they conventionally would be performed by the repository server but instead are performed by the designated task server. The off-loading of the operations occurs dynamically as operations are requested and does not affect where or how the objects are defined or are permanently stored. Thus, the repository server, also called the owning server, does not relinquish ownership of the affected object. The off-loaded operations are generated by request from end-user or application processes executing in client environments of the computer processing system, but the off-loading is transparent to the end-user or source application that originated the request for the operation. Only an administrator process of the repository server is aware of the resource re-balancing.

In one aspect of the invention, for application in a distributed computer processing system, a client process generates a requested operation on an object, such as an operation on a file stored in a direct access storage device (DASD) of a server or a pipe operation of a named pipe in the server. The operation request is received at a client environment router, which determines if the operation is one of an off-load operation set, comprising operations that ordinarily would be performed at the owning repository server but which will instead be performed at a task server of the system. At initial connection of the client environment to the repository server, or at each request, the client environment is notified of an identifier that identifies the task server at which the off-load operation set will be performed. The client preferably is notified at initial connect and stores the task identifier, thereafter directing all off-loaded requests to the identified task server. The off-loaded operations are then performed at the identified task server, and the object information in the repository server affected by the requested operation is updated, where necessary, through server-to-server operations.

If the invention is implemented in conjunction with named pipe operations, for example, a designated pipe server handles the opening, reading, writing, and closing of pipes in response to pipe operations requested from a client environment. In the case of other off-loaded file operations, such as advisory byte range locking, the requesting client opens the data file using the repository server, but uses a byte range lock server to which lock operations are off-loaded to handle all lock and unlock requests.

In yet another aspect of the invention, the primary pipe functions of more than one server in the computer processing system are performed by a single designated task (pipe) server. That is, a single pipe server at a node of the network performs off-loaded pipe functions from several other repository servers at the same node and from servers at other nodes, and in that way reduces the workload of many servers at many nodes.

In this way, access to a data file is achieved without vertical partitioning of the affected data object and thereby promotes off-loading of functions other than the named pipes. For example, byte range file lock, unlock, and query operations on a data file can be off-loaded to a different byte file server from the server that manages file read and write operations on the same data file. A client that requests byte range locking opens a data file as described above, so that the metadata cache contains information that identifies which server can be consulted locally for the file information and so that the client receives an open token for the file. The requesting client sends the open token with a byte range lock request to permit handling of the request. When a byte range lock operation is concluded, the requesting client closes the data file and the owning repository server notifies the byte range lock manager (task) server, which purges all associated locks for the file.

Other features and advantages of the present invention should be apparent from the following description of the preferred embodiments, which illustrate, by way of example, the principles of the invention.

DESCRIPTION OF THE PREFERRED EMBODIMENTS

Figure 1:
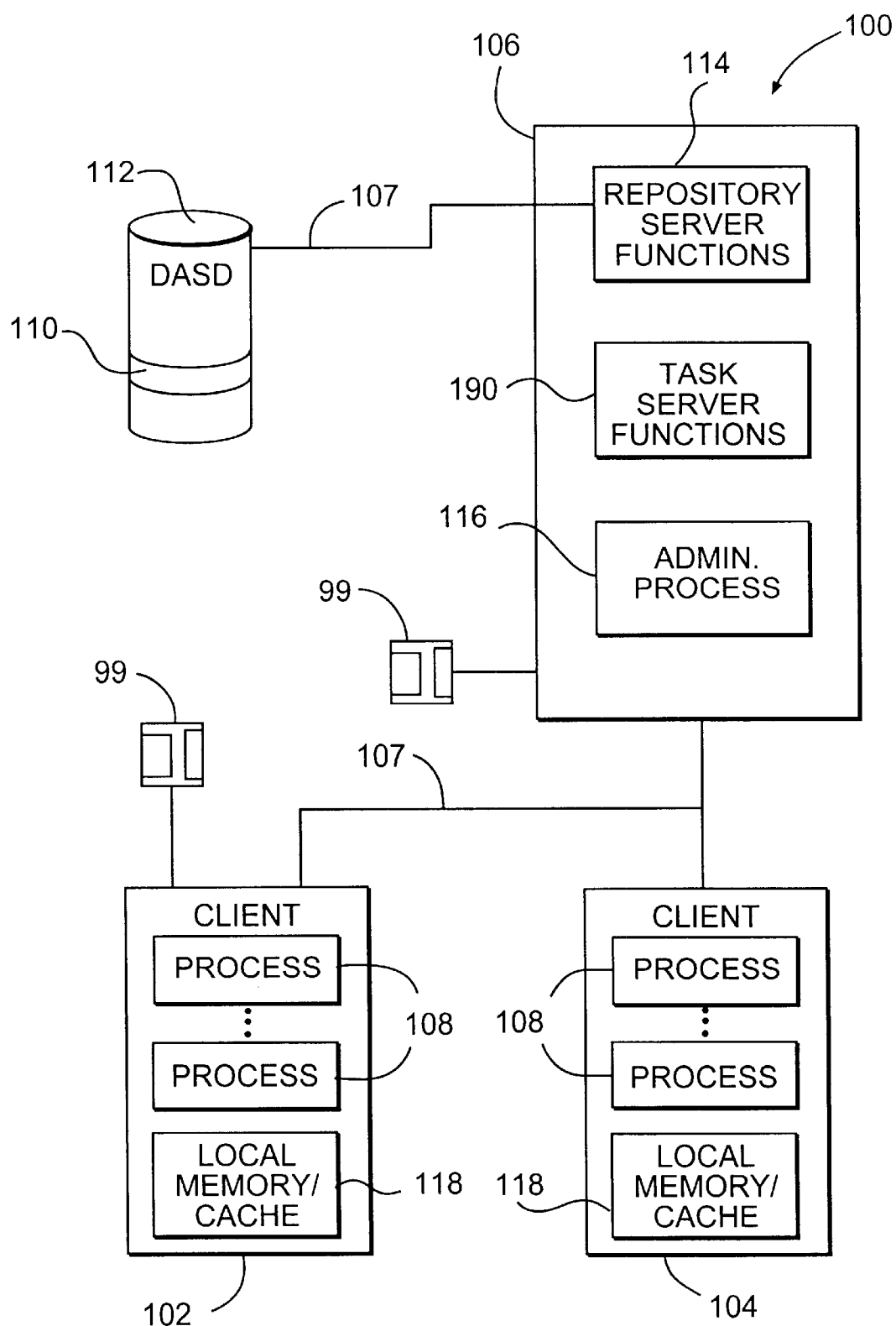
FIG. 1 is a functional block diagram of a byte file server and associated client machines in a distributed computer processing system constructed in accordance with the present invention.

FIG. 1 shows a functional block diagram representation of a distributed data processing system 100 in which remote clients 102, 104 communicate with a server 106 over a network 107. Computer processes and operating modules are represented by blocks within each of the respective clients and server. In the first client 102, for example, multiple processes 108 within the client environment request access to data objects. The data objects can comprise data files or pipe objects 110, or other system objects, that are stored in a repository comprising one or more permanent storage or direct access storage devices (DASD) 112 that are associated with a repository server 114. The repository server 114 is the repository for a set of objects such as files and named pipes. The information that defines and describes these objects is called metadata and is stored on DASDs 112 that are owned and maintained by the repository server 114 for those objects, i.e., objects are said to be owned by a particular repository server where they are stored on DASD that is also owned by (or connected to) that same repository server. It should be understood that the DASD can be any recordable storage device, such as a disk drive, tape drive, or other device that can record data in non-volatile memory storage.

Some operations are off-loadable to a separate task server for the purpose of reducing the load on the repository server. This off-loading is optional and depends on input from the repository server administrator process or equivalent server loading algorithms in a repository server. When a repository server does not off-load operations to a task server, but instead, performs those operations itself in the same systems environment, the repository server and the task server can be thought of as a single server (106) because they share a common server operational environment. Primary service operations include those operations that have a direct dependency on repository objects. Task server operations, on the other hand, involve off-loadable operations that do not have extensive dependencies on the repository server object repository.

In the preferred embodiment, a look-up operation is performed by a repository server when a client requests an operation on an object such as a data file or a named pipe. Accordingly, the repository server 114 provides a response to that look-up operation that includes (1) object metadata to be stored in the metadata cache 118 in the requesting client environment and (2) optionally a task server identification. The object metadata provides information about the object on which the operations will be performed, while the task server identification specifies the server node to which the operations have been off-loaded, if they were off-loaded.

Data operations are off-loaded from a repository server in the sense that the operations are performed by a task server different from the repository server that conventionally would perform the operations. The off-loaded data operations can include, for example, named pipe operations such as pipe open, pipe read, pipe write, and pipe close. With respect to the preferred embodiment, these pipe operations will be referred to as repository server pipe operations. An administrator process at the repository server determines if operations are to be off-loaded to a task server, determines which server is to be that task server, and informs a requesting client that operations are to be forwarded to a designated task server node location, where they will be performed.

Figure 2:
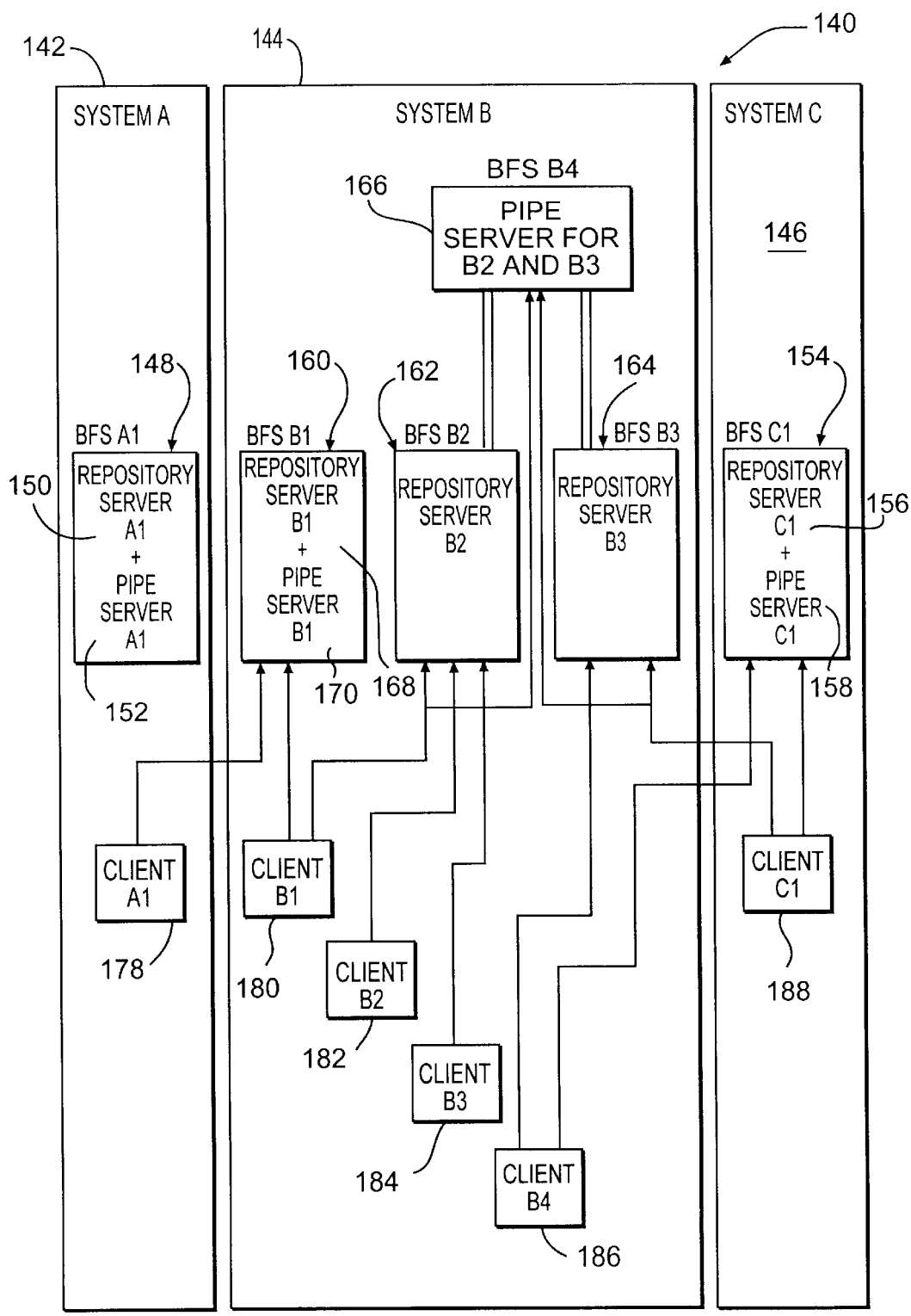
FIG. 2 is a function block diagram of a distributed computer processing system constructed in accordance with the present invention.

FIG. 2 illustrates a generalized distributed computer processing network 140 constructed in accordance with the invention. The system includes three systems 142, 144, 146 that are labelled System A, System B, and System C, respectively. It should be understood that the three systems represent interconnected networks that operate in accordance with operating environments such as provided, for example, by the "VM/ESA" operating system product provided by International Business Machines Corporation (IBM Corporation). Thus, each of the three systems illustrated in FIG. 2 could provide different operating environments.

Each of the three systems 142, 144, 146 includes one or more servers, each of which potentially comprises a primary file server and/or a task server. A task server handles a particular set of off-loadable operations, such as pipe operations, whereupon it is also called a pipe server. Then a pipe server is a particular type of task server. When such off-loadable operations are not actually off-loaded to another server, then the same server performs both primary services and task services. This is illustrated by the server 160, which acts as both a repository server 168 and a pipe server 170. However, when off-loading occurs, the pipe server for a repository server is relocated to another server environment. This is illustrated by the server 162, which has off-loaded its pipe server to the server environment 166.

Any server environment has the potential to perform either repository services or off-loadable task services (such as pipe services). These server environments are illustrated in FIG. 2 as Byte File Servers (BFSs), whether or not off-loading has occurred.

Thus, System A 142 includes a byte file server 148 designated BFS A1, which comprises both a repository server 150 that performs most conventional data operations expected of conventional file servers and a pipe server 152 that performs named pipe operations. Similarly, the third system, System C 146, includes a byte file server 154 (designated BFS C1) that comprises a repository server 156 and a pipe server 158.

System B 144 includes four byte file servers 160, 162, 164, 166 designated B1, B2, B3, and B4, respectively. The first System B server 160 includes a repository server 168 and a pipe server 170. It should be noted that the B2 and B3 byte file servers do not include their own pipe servers. Rather, B2 and B3 make use of the fourth byte file server 166, designated B4, as their dedicated pipe server. It also should be noted that a client 178 (Client A1) associated with the first system 142, System A, has both its primary and its pipe operations performed by the BFS B1 server 160 of the first System B byte file server 160. This is indicated by the line connecting the Client A1 178 to the B1 server 160. Thus, it should be clear that the present invention contemplates byte file servers that can perform general repository server functions for associated client machines in common with conventional file servers, can perform off-loaded operations as task server for servers within the same operating environment, and can perform any operations for client machines, in like operating environments and in different operating environments.

FIG. 2 shows that other distributions of data operations can be accommodated by the byte file servers of the present invention. For example, the presence of a connecting line from the Client B1 180 to the System B server 160 (BFS B1) and from the Client B1 to the second System B server 162 (BFS B2) indicates that the Client B1 uses BFS B1 as its pipe file server and uses BFS B2 as its primary file server. FIG. 2 also illustrates that a client such as Client B1 180 can utilize multiple repository servers, each of which may or may not have off-loaded its pipe operations to a separate pipe server. Client B1, for example, goes to server BFS B1 160 or BFS B2 162 for primary services, depending on which repository server owns the object that is associated with its current operation. In this same example, Client B1 180 does to the same server, BFS B1 160, for pipe operations as for primary service operations. However, for pipe objects stored in the repository managed by the repository server BFS B2 162, it must direct its pipe operations to the server BFS B4 166, where pipe operations have been off-loaded from BFS B2 162.

FIG. 2 also illustrates that a single server, such as BFS B4 166, can be the pipe server for more than one repository server, as illustrated by repository servers BFS B2 162 and BFS B3 164.

FIG. 2 illustrates other configurations of repository server/task server operation sharing that can be accommodated by the byte file servers constructed in accordance with the present invention. For example, the connecting lines leading from the client machine 182 called Client B2 indicate that this machine uses BFS B2 as its repository server and uses BFS B4 as its pipe server. A similar arrangement holds for the client machine 184 called Client B3. The client machine 186 called Client B4 uses BFS 164 of System B and BFS C1 154 of System C as its repository servers. For pipe operations on pipes that are owned by Repository Server B3, the client machine Client B4 goes to the pipe server BFS B4 166 in System B, while for pipe operations on pipes that are owned by Repository Server C1 156, the client machine Client B4 186 goes to the same server BFS C1 154 in System C as where the pipe object is owned. Similarly, the client machine 188 called Client C1 in System C uses BFS B3 164 of System B and the Repository Server 156 of BFS C1 154 in System C as its repository servers. For pipe operations on pipes that are owned by Repository Server B3 164, the client machine Client C1 goes to the pipe server BFS B4 166 in System B, while for pipe operations on pipes that are owned by Repository Server C1 156, the client machine Client C1 goes to the same server BFS C1 154 in System C as where the pipe object is owned. Thus, the present invention contemplates sharing byte file servers across operating system boundaries.

Thus, if a byte file server is lightly used for its repository server functions, such as opening data files for operations by client processes, then it can be used as a pipe server for its own (local) repository server and as a pipe server for other byte file servers as well. More particularly, any byte server is functionally capable of performing either the repository (primary) server functions associated with managing and storing objects and data, or the pipe server functions, or both sets of functions. The loading and balancing of these functions is administered as needed by a server administrator person or process of the respective byte file servers. In this way, a lightly loaded byte file server can be designated as a dedicated pipe file server for multiple machines, taking on the load of the pipe services of other byte file servers as well as the pipe services defined in its own repository.

A server administrator process 116 (see FIG. 1) is illustrated in the byte file server 106 of the system 100. Those skilled in the art will appreciate that each of the byte file servers is a computer system having a central process unit (CPU) and operating memory, which typically comprises some type of random access memory (RAM). Those skilled in the art also will appreciate that the repository servers and task servers constructed in accordance with the present invention comprise operating system processes that are implemented as machine instructions loaded into server operating memory and executed by the CPU of a subject byte file server to cause the desired machine actions to take place. In a similar fashion, the server administrator process typically will be provided by execution of a set of instructions that cause the byte file server to take desired machine actions. Those skilled in the art will understand without further explanation how to implement the server administrator process so as to perform load balancing between repository servers and task servers in accordance with the particular programming environment in which the invention is implemented.

The byte file server CPU can comprise a variety of well-known processors by manufacturers such as Intel Corporation, Texas Instruments, Inc., and Motorola, Inc. The programming language in which the process instructions are provided can comprise any one of several alternatives, depending on the application, operating environment, and choice of processor manufacturer.

Figure 3:
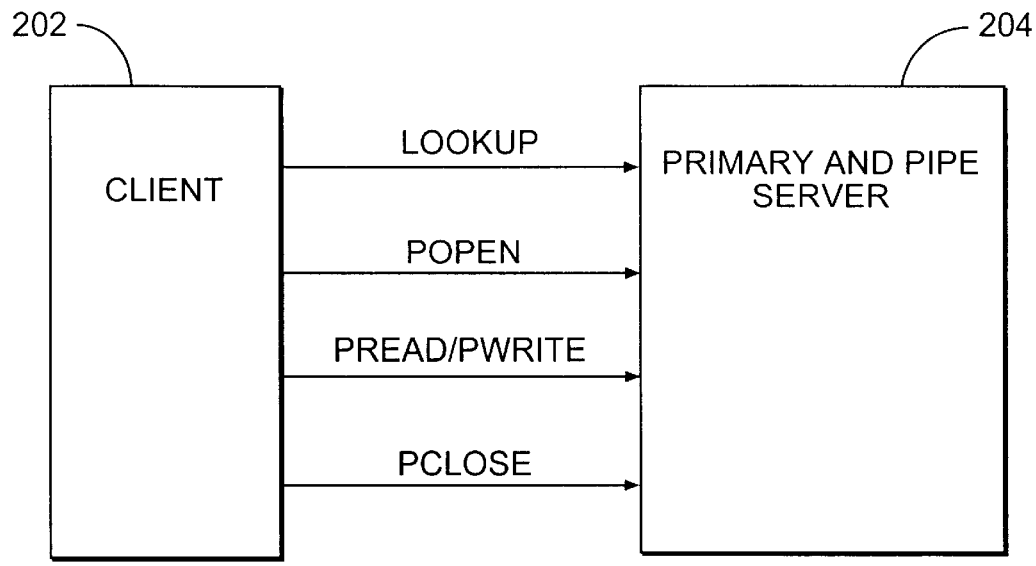
FIG. 3 is a functional block diagram of a client environment and a byte file server, having a repository server and pipe server, that uses its own associated pipe server for named pipe operations.

A byte file server can use its own associated pipe server for named pipe operations. This is illustrated in FIG. 3, which shows a client 202 that generates data operation requests comprising pipe operations that are sent to its byte file server 204, which includes both a repository server and pipe server. As indicated in FIG. 3, the pipe operations include pipe open (abbreviated popen), pipe read and pipe write (abbreviated pread and pwrite, respectively) and pipe close (abbreviated pclose) operations. This arrangement is the default configuration administered by a byte file server of the preferred embodiment.

The preferred embodiment incorporates a distributed processing computer system such as provided by the "VM" product from IBM Corporation. Accordingly, when a client requests access to a data object comprising a named pipe or data file at a server, the client must first make a connection with the server and then the server must perform a look-up function to resolve the data object path name and determine if that data object is a pipe. If the pipe functions of the server are being performed by a task server, then the repository server will return notifying information to the client at the time of initial connection to the repository server. The server look-up function performed by the byte file server returns the look-up information, commonly referred to as metadata, to the requesting client machine. Should the decision to off-load operations to the task server change after the time of connection, this change is reflected by the metadata returned as a response to a look-up operation to the repository server. At the client machine, the information is stored in metadata cache memory. The information includes an indication of the system node (the pipe server) to which the pipe operations should be directed, as well as other associated operations that will be known to those skilled in the art without further explanation.

Thus, a client is informed of off-loaded operations for a server when that client first connects to that server and is advised of changes in the off-load status through cache metadata. For example, that client need not thereafter send requests for pipe operations to that server. Rather, a client router process can determine that all pipe requests for that server can be sent instead to the task server of the server.

Figure 4:
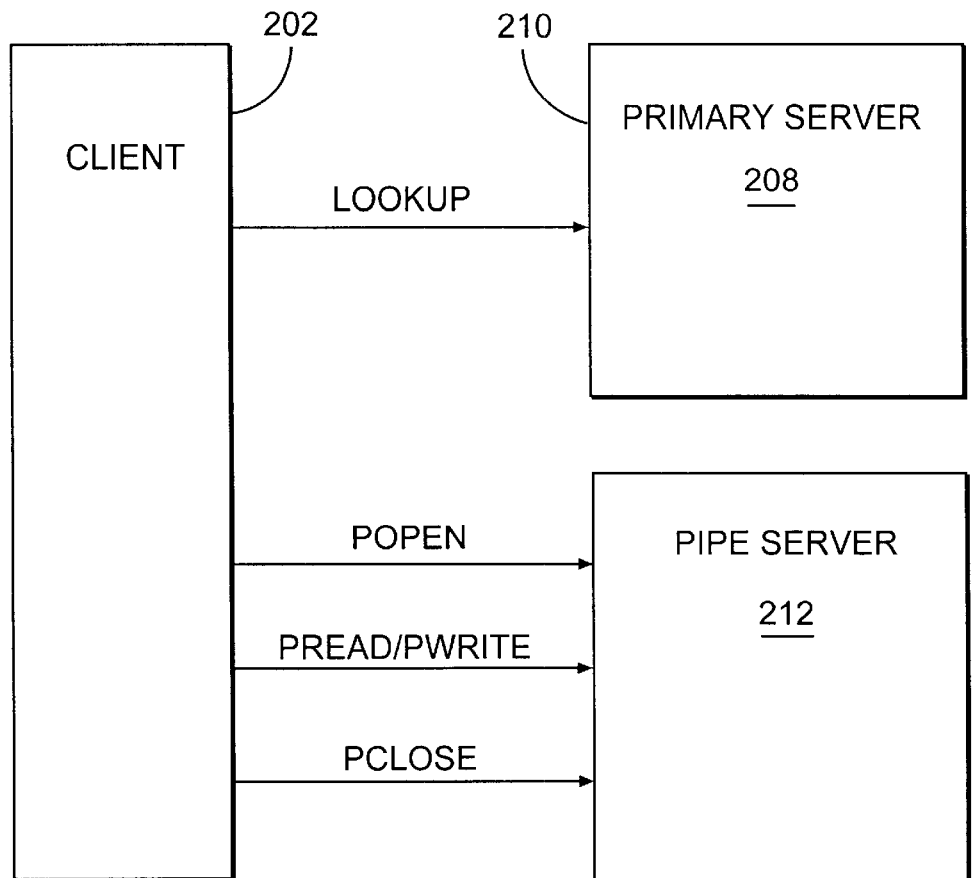
FIG. 4 is a client/byte file server functional block diagram that illustrates processing steps performed in handling look-up operations and directing pipe operations to a different byte file server.

Referring to FIG. 4, which illustrates the case where pipe operations have been off-loaded to a separate pipe server, the repository server 210 handles look-up operations but the client router directs pipe operations to a different byte file server 212. The client 202 selects a repository server 208 of a byte file server 210 based on the path name used in the pipe operation. Generally, the object path name indicates which server is the repository manager for the object to which the operation applies. Either when connecting to the server 208 or when receiving metadata response from the pipe object look-up operation to the server 208, the client router determines that any subsequent pipe operations are to be routed to the pipe server 212 of the byte file server 214 that has been designated by the repository server 208 as the task server for its pipe operations. It should be understood that the first byte file server 210 can optionally include a pipe server and the second byte file server 214 can optionally include a repository server. With respect to the FIG. 4 configuration, it also should be noted that it is not necessary to send the pipe open operations to the repository server that is associated with a pipe object. Thus, only the look-up functions are indicated as being performed in the repository server 208, while the remaining pipe operations are all performed in the second byte file server, which is acting as the pipe server 212 for the repository server 208.

Figure 5:
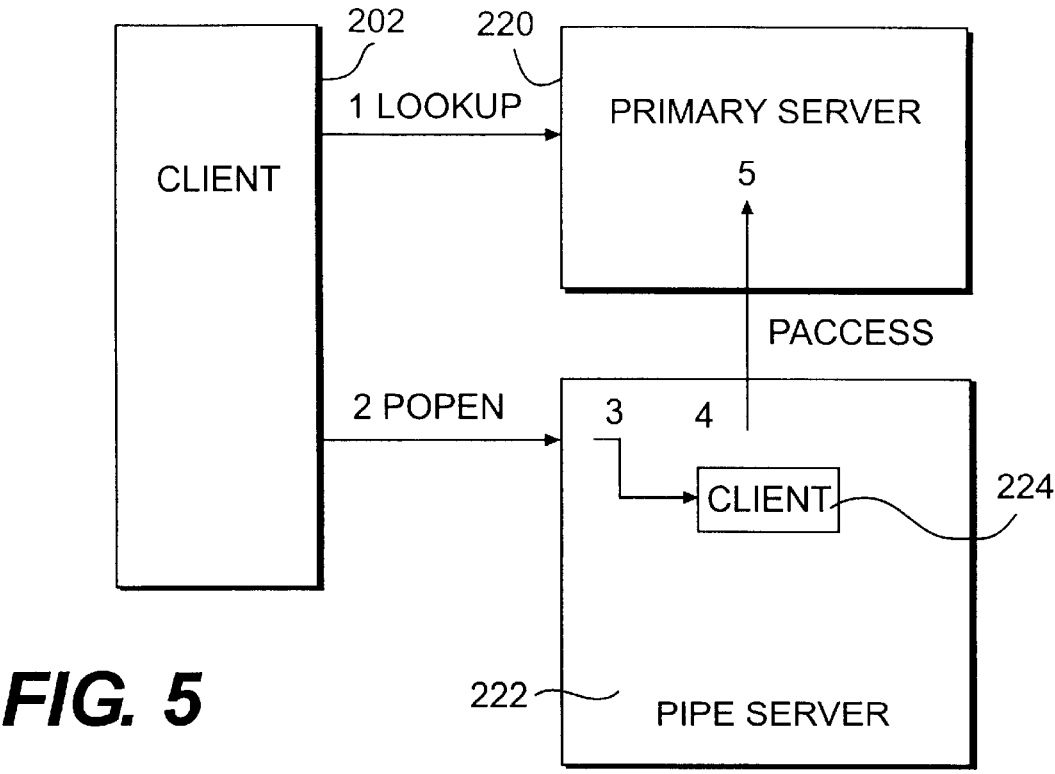
FIG. 5 is a client/byte file server functional block diagram that illustrates processing steps of a configuration in which a pipe open operation requires authorization verification by the repository server.

The present invention also contemplates accommodating data object access control provisions. FIG. 5 shows a configuration in which a pipe open operation requires client authorization verification by the repository server. This is accomplished by having the pipe server temporarily act as a client. In FIG. 5, a client machine 202 uses a first byte file server 220 as a repository server and uses a different byte file server 222 as a pipe server. The box 224 in the pipe server labelled client indicates that the pipe server is acting as a client, which comprises the pipe server making a service request called a pipe access request (abbreviated "paccess") to the repository server. The processing steps executed in the course of performing the access control are indicated by the numbered connecting lines between the elements of FIG. 5. The initial step is for the repository server to receive a look-up request from the client machine (indicated by the numeral 1) and for the client machine to initiate a pipe open operation (indicated by "popen" and the numeral 2). The numeral "3" indicates the request for access, which the pipe server 224 implements by the pipe access request from the server administrator process described above.

In the preferred embodiment, the system is implemented in accordance with the well-known POSIX standard and the pipe server is defined as a "super user" in the POSIX standard. Those skilled in the art will understand that such a designation gives the pipe server the capability to connect with the repository server and perform privileged operations, such as gain access to data objects. The pipe open processing (popen) operation in the pipe server 222 passes authorization identification information associated with the connection from the client machine as parameters in the pipe access request (indicated by the numeral "4"). The repository server uses this information to do an authorization check on the pipe open originator, the client machine. The check operation is indicated with the numeral "5".

The results of the authorization check are returned to the pipe server 222 and indicate authorization to proceed with the pipe open. This is what is referred to as an "open instance". After the pipe open is completed, an open token is returned to the client machine 202. Thereafter, only the open token is validated. In this way, no further authorization checking need be done. Those skilled in the art will understand that the type of authorization scheme described herein presumes that the system can pass authorization information to the repository server 220 when the pipe server 222, acting as a client, connects to the repository server. The authorization information cannot be influenced by the connecting "client" 202. The authorization information is established by a client machine 224 that is designated a super user, that is, an administrator for the data repository.

Figure 6:
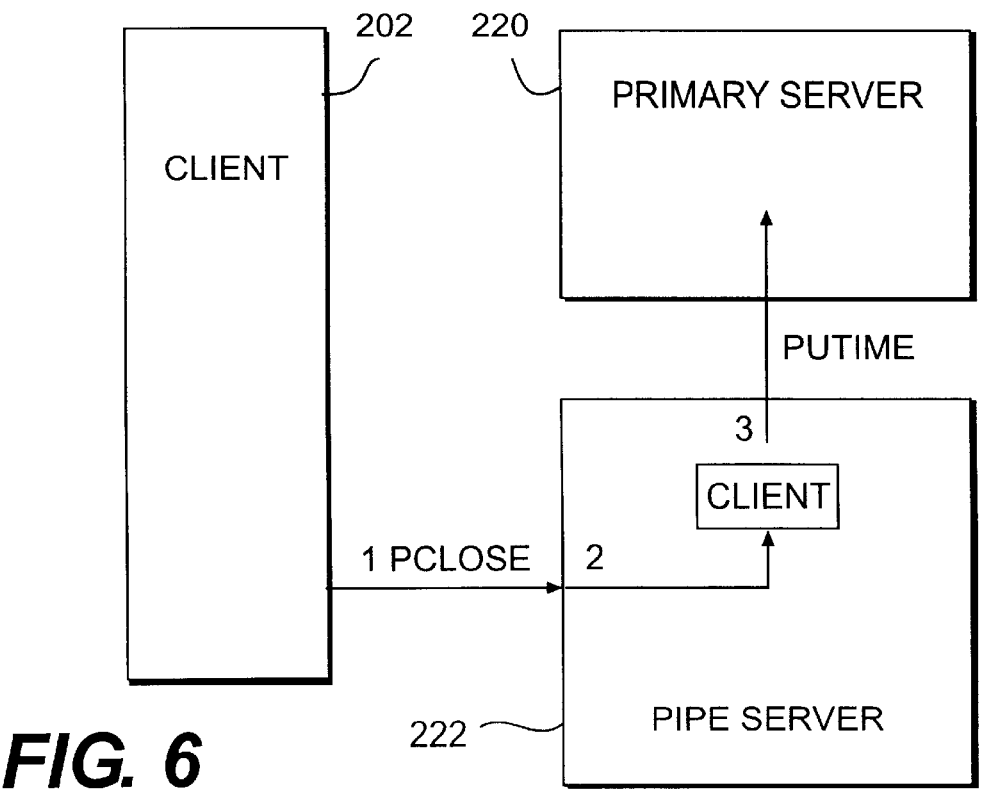
FIG. 6 is a client/byte file server functional block diagram that illustrates processing steps for a pipe close operation (pclose) from a pipe server to the repository server using update time stamps.

FIG. 6 illustrates a pipe close operation (pclose) from a pipe server to a separate repository server, where the pipe close operation is necessary to update time stamps that are part of the POSIX operating standard. Those skilled in the art will appreciate that time stamps for pipe objects must be kept in the repository server's object repository. The pipe server operation for this pipe function is illustrated in FIG. 6 and is abbreviated as "putime". Thus, the operating steps carried out in FIG. 6 begin with a pipe close request from a client machine 202 to a pipe server 222, indicated by the numeral "1", which is received at the pipe server, indicated by the numeral "2". As before, the pipe server acts as a client machine relative to the repository server 220 and generates an appropriate update time request to the repository server, as indicated by the numeral "3".

Putime request may be invoked periodically to update the relevant time stamps and statistics, and then to cause corresponding updates to the objects in the repository owned by the repository server.

Figure 7:
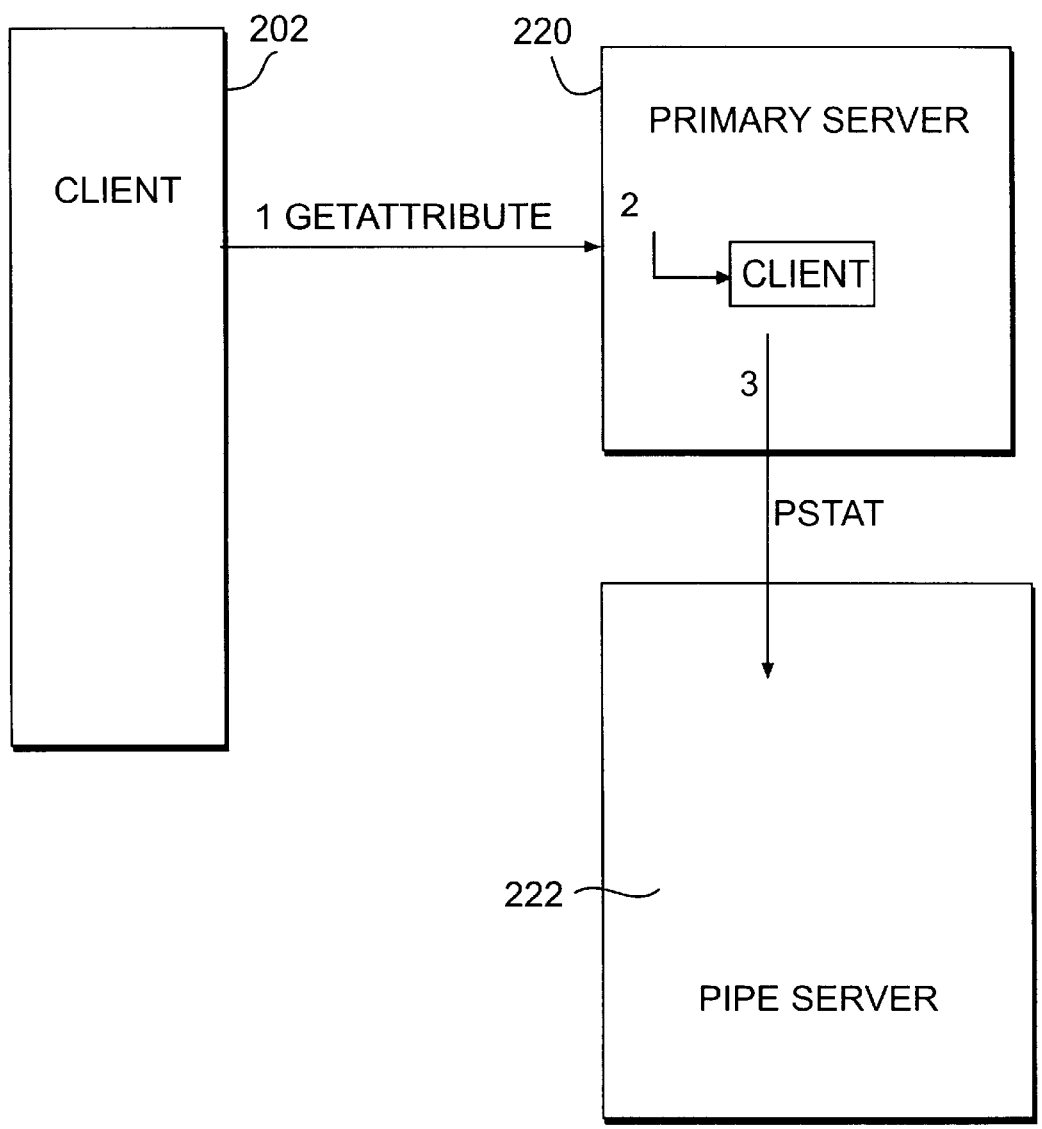
FIG. 7 is a client/byte file server functional block diagram that illustrates processing steps of a configuration wherein the pipe server is separate from the repository server, the data object is a pipe, and the repository server initiates a request to obtain the latest time stamp and pipe size from the pipe server.

The preferred embodiment also implements a "get attribute" pipe operation from a requesting client machine to the repository server. FIG. 7 illustrates the configuration wherein the pipe server 222 of a client machine 202 is separate from the repository server 220, the data object is a pipe, and the repository server initiates a request to obtain the latest time stamp and pipe size from the pipe server. The request is indicated and abbreviated in FIG. 7 as "pstat" (pipe stat). Such an operation again requires "super user" authority under the POSIX standard and requires the requesting repository server 220 to act as a client machine by requesting a pipe status service from another server 222. As indicated in FIG. 7, the initial operating step is a "get attribute" request from the client machine, indicated by the numeral "1", which is received at the repository server (indicated by the numeral "2") and which results in the repository server acting as a client to the pipe server. Thus, the repository server generates a pstat request to the pipe server, indicated by the numeral "3". The pipe server receives the information and updates the time stamps and other statistics for the pipe data object and provides information that the repository server uses to update its metadata on DASD to reflect the new time stamps and other statistics for the pipe object.

The operation of the byte file servers described above will be better understood with reference to pseudo code that describes the operating steps followed by the byte file servers for various data operations. For example, the operating steps performed by a server in a pipe open operation are illustrated in the pseudo code listed in Table 1 below, comprising lines 100 through 155. That is, pipe servers execute program logic described by the pseudo code below in processing a pipe open request. The pseudo code is explained in greater detail in the text following the code listing:

TABLE 1

```
100    Begin (155) Popen logic in server for pipe open procedure
101      *Function—open a named pipe is selected
102      *Input—
103        + Repository server file server identification
104          (file server id)
105        + Pipe object identifier returned from look-up done
106          by the repository server
107        + Mode—Read or write
108        + Wait Option—wait for complementary open
109      *Output—
110        Open Token
111      *Logic—
112      If (116) Repository Server = Pipe Server
113        Validate that client has token (has done a look-up)
114        Validate permission for the current operation
115        Read metadata from DASD (record for the pipe object)
116      Else (125) Repository Server ¬= Pipe Server
117        Send PACCESS request to the Repository Server; passing
118        Pipe Object Identifier and name information
119        Mode (Read or Write)
120        Note—Information for identifying the originating
121          server that is needed for permission checking
122          at the Repository Server is obtained securely
123          from the control program when the connection
124          is completed.
125      Endif (112) Repository Server = Pipe Server
126      Get storage for OTB (Open (pipe) Token Block)
127        Holds open pipe information, represents an open instance for
```

TABLE 1-continued

| | |
|---|---|
| 128 | a pipe, and includes a buffer that is used for this open and |
| 129 | for subsequent pipe operation responses that are associated |
| 130 | with this pipe open instance. |
| 131 | Initialize the OTB with: |
| 132 |    Open Type (read or write indicator) |
| 133 |    Originating Client Identifying Information |
| 134 |    Originating Client connection path (for current |
| 135 |      response). |
| 136 |    Repository Server ID |
| 137 |    Current Response Control Information |
| 138 |    Pipe token and other identification information. |
| 139A | Establish access to OTB via a hash table |
| 139B | Generate an Open Token. |
| 140 | If (142) No previous OTBs exist for this pipe object |
| 141 |    Pipe token = 0 |
| 142 | Else (145) previous OTB(s) exist for this pipe object |
| 143 |    Get Pipe token from one stored in one of the |
| 144 |    existing OTB(s) for this pipe. |
| 145 | Endif (140) No previous OTBs exist for this pipe object |
| 146 | Call Pipe Processor to process the pipe open (initialize |
| 147 |    the pipe), passing |
| 148 |    operation = OPEN |
| 149 |    Pipe Token (0 only for first open); value set by Pipe Processor. |
| 150 |    Open Token (OTB pointer) |
| 151 |    Mode (read/write) and wait option from popen parms |
| 151A |    Pipe Processor returns a pipe token. |
| 152 | Store pipe token in the OTB. |
| 153 | Note—Pipe Processor above takes care of notifying any |
| 154A |    other clients whose opens may be waiting for this open. |
| 154B | Return the open token to the originating client. |
| 155 | End (100) popen |

The pseudo code of Table 1 specifies the operating sequence for performing a pipe open operation. These are the operating steps that would be performed by one of the pipe servers 106 illustrated above in FIG. 6 after receipt of a pipe open request. The process input parameters are listed in lines 102 through 108. The repository server name in lines 103–104 is returned from a look-up operation or return information from the repository server when the originating client first connects to that server. The wait option input parameter permits client pipe open sychronization with other pipe open operations for the same pipe, as will be understood by those skilled in the art. The output is an open token, which is passed with read, write, and close operations to the same repository server. That is, the output token permits a requesting client machine to continue with operations on the same open pipe instance.

In the pseudo code of Table 1, the steps of the byte file server pipe open logic are laid out beginning at line 111. Initially, the pipe server determines if it is also the repository server for the pipe operations (line 112). If the server is acting as its own pipe server, then there is no need to execute a PACCESS command and the pipe must be opened and maintained by this repository server itself. This is the case when the pipe operations have not been off-loaded to a separate pipe server, defaulting to requiring the repository server to do its own pipe server operations. Accordingly, operating steps are followed as specified in lines 113 to 115, which show that pipe request validation steps are performed and the pipe metadata is read from DASD where the pipe object resides. If the repository server is not also acting as its pipe server (line 116), then it must be the case that this processing is being carried out because this server is a pipe server to another byte file server. Therefore, this server must gain access to the named pipe by first validating access permission to the requested pipe. The pipe server therefore sends a PACCESS request to the repository server (lines 117 to 125). These steps comprise making a connection to the task server if connection does not already exist to that server, and passing parameters that are needed to check the authorization of the originating client to execute the pipe open. A positive response for this pipe access operation indicates that the pipe open operation is permitted to continue in the pipe server.

Independent of the results of the conditional logic in steps 112–124, an open token block (OTB) must be allocated for the open pipe information corresponding to the current named pipe open instance. This operation is specified in lines 126 to 130 of the pseudo code. Initializing the OTB includes obtaining information from the open request that indicates the mode of the open (read or write), the originating client to whom response will be sent, connection path, repository server name, control information, and a pipe token and other information, as specified in lines 131 to 138 of the pseudo code. Establishing access using a hash table (line 139) is a conventional operation that should be known to those skilled in the art without further explanation. In the step specified by line 139B, an open token is created for return to the originating client. This token will be used as input by subsequent read/write and close operations for this same pipe open instance where the receiving server will use the open token to find the appropriate OTB for the open instance.

Pipe tokens are used to identify a pipe object for which any open instance exists in the server. It is used to identify the pipe object for purposes of all current opens for that pipe object. Detailed pipe data operations are managed by a Pipe Processor, which is a component of a pipe server. The Pipe Processor moves data in and out of a pipe as a result of pipe writes and reads. It manages synchronization of pipe waits where wait options are used. It also handles other details for pipe operations that are beyond the scope of this preferred embodiment. The Pipe Processor is invoked for each pipe operation (pipe open, pipe write, pipe read, and pipe close) so that it can manage the pipe data and synchronization are required by the pipe object opens. In response to a pipe open invocation of the Pipe Processor, the Pipe Processor returns a pipe token that identifies the current pipe object for all current pipe open instances.

In lines 140 to 145 of the pseudo code, the server checks for the existence of a previous open token block. If such a block exists, indicating the named pipe has already been opened, the existing pipe token is retrieved from a previous OTB (lines 143 to 145). In lines 146 to 151, the remaining pipe open functions are performed by the invocation of the Pipe Processor component of the pipe server. In line 152 the pipe token is stored in the open token block (OTB) of the pipe server and the pipe open processing is concluded. In the preferred embodiment, a wait option is accommodated in which clients waiting for a pipe are informed of open processing for the pipe they are waiting on (lines 153–154). Pipe open processing concludes at line 155.

The operating steps of the pipe read operation described above are illustrated by the pseudo code listed in Table 2 below, comprising lines 100 through 149.

TABLE 2

| | |
|---|---|
| 100 | Begin (149) Pread logic in the task server for pipe read procedure |
| 101 | *Function—read from a named pipe |
| 102 | *Input— |
| 103 | + Open Token |
| 104 | + Byte Length of data requested for the pipe read |
| 105 | + Wait/NoWait Option (may be different than specified |
| 106 | with the open) |
| 107 | *Output - |
| 108 | + Effective Length (May be < Requested, including |
| 109 | 0, is set when there is an error condition). |
| 110 | + Pipe data (that was read) |
| 111 | *Logic - |
| 112 | Validate the input open token |
| 113 | Use open token to find the OTB. |
| 114 | If (118) pread length > allowed by Base Buffer |
| 115 | Allocate additional buffers for the pipe read |
| 116 | Format pointer list in Base Buffer area for passing |
| 117 | buffer pointers to the Pipe Processor |
| 118 | Else (121) |
| 119 | Set up pointer list in Base Buffer area for pointing |
| 120 | only to the Base Buffer itself. |
| 121 | Endif (114) pread length > allowed by Base Buffer. |

TABLE 2-continued

| | |
|---|---|
| 122 | Call Pipe Processor to process the pipe read, passing |
| 123 | operation = READ. |
| 124 | Pipe Token (from OTB) |
| 125 | Open Token |
| 126 | Requested pipe read data length. |
| 127 | Mode and wait option from pread parameters. |
| 128 | Address of the pointer list to the buffers for the |
| 129 | output of the read. |
| 130 | Address of the field where Pipe Processor is to post |
| 131 | the effective length of the read upon completion. |
| 132 | Response will indicate effective length of the read |
| 133 | which can be less than that requested. Effective |
| 134 | length is initially stored in the OTB. |
| 135 | If (138) wait required |
| 136 | Response is handled by the Pipe Processor when a pwrite |
| 137 | or pclose satisfies the condition of the pread wait. |
| 138 | Else (148) read is satisfied immediately. |
| 139 | If (142) Effective Length > 0 |
| 140 | Set ReadDone indicator in OTB so that we will know to |
| 141 | update time stamps at close. |
| 142 | Endif (139) Effective Length > 0 |
| 143 | Note: Pipe Processor will respond to waiting writers as |
| 144 | satisfied by this successful read. Such writers may |
| 145 | be waiting for a read to empty out the pipe sufficient |
| 146 | for additional write operations to complete. |
| 147 | Respond to the read request. |
| 148 | Endif (135) wait required |
| 149 | End (100) Pread |

As indicated in the pseudo code (lines 102–106), the read processing requires input of the open token (for authorization control), the data length, and a wait option accommodated by the preferred embodiment. The output is the effective length and pipe data (lines 107–110). After validating the open token and finding the OTB (lines 112–113), steps are taken to ensure adequate read buffer space for the pipe (lines 114–121). The actual pipe read operation, to be performed by the above-mentioned pipe processor, is described in line 122–149 of the pseudo code, with the wait option steps comprising lines 135–148.

The operating steps for the pipe write operation described above are illustrated in the pseudo code listed in Table 3 below, comprising lines 100 through 132.

TABLE 3

| | |
|---|---|
| 100 | Begin (132) Pwrite logic in the task server for pipe write procedure |
| 101 | *Function—write to a named pipe |
| 102 | *Input— |
| 103 | + Open token |
| 104 | + There is a wait option for writes whereby a write |
| 105 | may wait for the pipe to empty to make room |
| 106 | for the write to complete. The pipe empties |
| 107 | via pipe read completions. |
| 108 | + Length of pipe data |
| 109 | + Pipe data itself |
| 110 | *Output - |
| 111 | none |
| 112 | *Logic - |
| 113 | Validate input open token. |
| 114 | Use Open token to set up addressability to OTB. |
| 115 | Set up the input pipe write data buffer (list) |
| 116 | to call the Pipe Processor. |
| 117 | Call Pipe Processor to do the write operation, passing |
| 118 | Operation = WRITE |
| 119 | Pipe token |
| 120 | Open token |
| 121 | Wait indicator (input—indicates willingness to wait |
| 122 | for completion). |
| 123 | Pointer list for pipe write data. |
| 124 | Wait result (indicates that request must wait for later |

TABLE 3-continued

| | |
|---|---|
| 125 | completion). |
| 126 | Pipe Processor takes care of responses to waiting pipe |
| 127 | reads or closes that are to take place as a result |
| 128 | of a successful write to the same pipe. |
| 129 | Set WriteDone indicator in OTB that write completed so |
| 130 | that timestamp will be updated by close. |
| 131 | Send response to the requestor. |
| 132 | End (100) Pwrite |

The input and output parameters should be apparent from the listing. In the processing logic, validation and initialization takes place in lines 112 to 116. The pipe processor component of the pipe server is called in lines 117–125 and takes care of pipe write operations in lines 126–128. The write completion is indicated in line 129–130 and the response is sent to the requesting client machine in line 131.

The operating steps for the pipe close operation described above are illustrated in the pseudo code listed in Table 4 below, comprising lines 100 through 131.

TABLE 4

| | |
|---|---|
| 100 | Begin (130) Pclose logic in the task server for pipe close procedure. |
| 101 | *Function—close a named pipe |
| 102 | *Input— |
| 103 | + Open Token |
| 104 | *Output |
| 105 | (none) |
| 106 | *Logic— |
| 107 | Validate the Open Token. |
| 108 | Use Open Token to address OTB. |
| 109 | Call Pipe Processor to do the close, passing |
| 110 | Operation = CLOSE |
| 111 | Pipe Token |
| 112 | Open Token |
| 113 | The Pipe Processor will take care of responses to waiting |
| 114 | pipe reads or writes that are completed by this close. |
| 115 | If (117) ReadDone indicator is set ON |
| 116 | Generate time stamps for changes affected by pipe reads. |
| 117 | Endif (115) ReadDone indicator is set ON. |
| 118 | If (120) WriteDone indicator is set ON |
| 119 | Generate time stamps for changes affected by pipe writes. |
| 120 | Endif (118) WriteDone indicator is set ON. |
| 121 | If (126) this Pipe Server is ¬= Repository Server |
| 122 | Send PUTIME request to the Repository Server, passing |
| 123 | the new time stamps for updating metadata in the |
| 124 | Repository Server and the pipe object identifying |
| 125 | information. |
| 126 | Else (128) Pipe Server and Repository Server are same |
| 127 | Update timestamps via local metadata update (DASD write). |
| 128 | Endif (121) Pipe Server and Repository Server are separate. |
| 129 | Free the OTB. |
| 130 | Send normal Pclose response. |
| 131 | End (100) Pclose |

The programming logic for the pipe close operation should be self-explanatory, where again there are operation validation steps and the actual close communication operations are performed by a dedicated pipe processor component of the pipe server.

The operating steps for the pipe access operation described above are illustrated in the pseudo code listed in Table 5 below, comprising lines 100 through 126.

TABLE 5

| | |
|---|---|
| 100 | Begin (126) Paccess logic in the repository server for pipe access procedure. |
| 101 | *Function—Paccess for a named pipe. |
| 102 | *This function is processed by the Repository Server where |
| 103 | the Repository Server is not also the Pipe Server. |
| 104 | *Input— |
| 105 | + User/group identifiers for validating permission for |
| 106 | doing the pipe operation |
| 107 | comes from connect information to the pipe |

TABLE 5-continued

```
108        server.
109        + Pipe Identifying information (path and pipe name)
110        + Mode—read or write—comes from input parm to
111            the popen request.
112        + Client Identifying information
113      *Output -
114        + Return information indicating pass or failure.
115
116      *Logic -
117      Check that originating server has special
118          privileges for doing this function.
119      Validate pipe identifier (that it is defined)
120          and read (DASD) metadata record for the object.
121      Verify that User/group information passed to this operation
122          is one that has permission for the named pipe according
123          to metadata records.
124      Return information indicating pass or fail of the above
125          validations.
126    End (100) paccess
```

The programming logic of Table 5 describes an inter-server operation for validating access to a name pipe. The operation comprises verification of valid privileges and identifying information in lines 117–123. Such steps will be dependent on the particular operating system configuration in the system of implementation and are listed here for exemplary purposes. Thus, the details of such operations are conventional and will be known to those skilled in the art.

The operating steps for the pipe "utime" (Putime) operation described above are illustrated in the pseudo code listed in Table 6 below, comprising lines 100 through 118.

TABLE 6

```
100    Begin (118) Putime logic in the repository server for pipe update procedure.
101      *Function—update timestamps in repository server, originated
102          by Pclose in a separate Pipe Server (see Pclose).
103      *Input—
104        + read time stamp (if 0, no change)
105        + write time stamp (if 0, no change)
106        + Pipe identifying information
107      *Output -
108        None
109      *Logic -
110      Validate that requestor has special privilege to do this
111          function.
112      Validate the pipe object identifying information and
113          fetch the metadata record for the object.
114      If (117) validations pass
115          Update time stamps given on input and write metadata
116              record (to DASD) with the changes.
117      Endif (114) validation pass.
118    End (100) putime
```

Table 6 describes timestamp update procedures that comprise validation steps (lines 109–113) followed by the timestamp procedure (lines 114–117).

The operating steps for the pipe stat (Pstat) operation described above are illustrated in the pseudo code listed in Table 7 below, comprising lines 100 through 142.

TABLE 7

```
100    Begin (142) Pstat logic in the pipe server for request timestamp procedure.
101      *Function—request timestamp for a pipe (called from
102          Repository Server as a result of a get attribute request
103          for a pipe object—
104          sent to the Pipe Server if Pipe server not same as
105          the Repository Server). Repository Server updates timestamps
106          in catalogs as a result.
107      *Input-
108        + Pipe Path and Object Name Information
109        + Note—originating Repository Server id is needed but is
110              not passed because it is available via connection
```

TABLE 7-continued

```
111          information.
112     *Output-
113       + Response
114       + -read time stamp (0 indicates no change or pipe not
115            currently open for read.
116       + -write time stamp (0 indicates no change or pipe not
117            currently open for write).
118       + -pipe size—current number of bytes in the pipe
119     *Logic -
120     Check that originating server has special privileges for
121          doing this function.
122     If (139) OTBs exists for the pipe (found through hash table)
123       If (138) caller's server id is set in one (or
124          more) of the OTBs.
125       If (129) ReadDone indicator in the OTB is ON
126          Get current time and set it in read time stamp of the
127             response area.
128          Reset ReadDone indicator
129       Endif (125) ReadDone indicator in the OTB is ON.
130       If (134) Write Done indicator in the OTB is ON.
131          Get current time and set it in write time stamp in the
132             response area.
133          Reset WriteDone indicator
134       Endif (130) WriteDone indicator in the OTB is ON.
135       Call the Pipe Processor to get the
136          number of bytes currently in the pipe (pipe size).
137       Set result in the Response.
138       Endif (123) caller's file server id is Set in one (or
139     Else (141) no OTB exists for the pipe.
140       Return 0 values in time stamps.
141     Endif (122) OTBs exists for the pipe.
142   End (100) Pstat
```

Where Table 6 listed the program logic in the repository server for performing a timestamp update, Table 7 above lists the program logic in the pipe server responding to a request from the repository server for latest time stamps and pipe size. In the program logic, validation is first performed (lines 120–121) and then the timestamp logic begins (line 122). If the OTB exists, then the timestamp operation can be performed (lines 123–138). If no OTB exists, no timestamp can be provided (lines 139–141).

The distributed processing system described above provides a client with access to pipe data at a server without vertical partitioning of the affected pipe objects and with off-loading affected pipe objects. The server off-loads pipe operations that are used on pipe objects, specifically the operation set of pipe open, pipe read, pipe write, and pipe close. All other pipe operations are performed by the repository server. In this way, the distributed computer processing system supports named pipes by permitting operational (task) partitioning of the server independently of vertical partitioning of data repositories and thereby reduces server task loading.

Another example of operational off-loading contemplated by the byte file server constructed in accordance with the invention is off-loading of byte range lock operations. That is, byte range lock operations otherwise performed by a repository server can instead be performed by a byte range lock type of task server in a similar manner as pipe operations otherwise performed by a repository server were performed by the pipe server type of task server described above (FIGS. 2–7).

Figure 8:
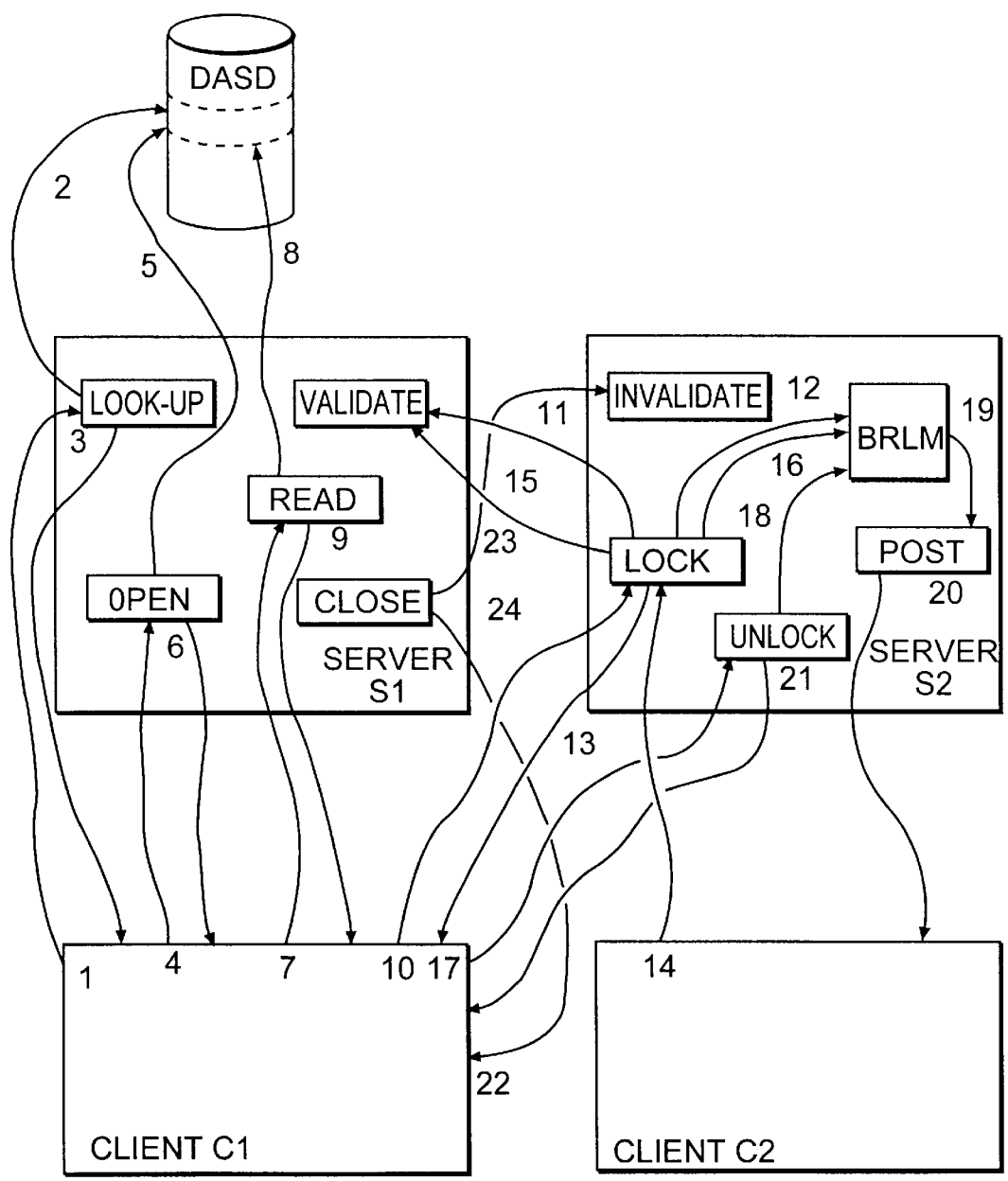
FIG. 8 is a functional block diagram that illustrates processing steps followed by a configuration in which there is off-loading of byte range lock operations.

FIG. 8 shows a first server S1 and a second server S2 as well as a first client C1 and a second client C2. A direct access storage device (DASD) is connected to the first server S1. In an exemplary operation, the first client sends a look-up operation (labelled with numeral "1") to the first server S1, where the path name passed with the look-up operation resolves to a data file in the first server S1 data repository (labelled with numeral "2"). The look-up operation is similar to that referred to above with respect to named pipe operations. The look-up operation resolves the path name for the file and returns internal identifiers for the path elements, such as directories, and the file object itself. This return information is designated with numeral "3" in FIG. 8 and is retrieved from metadata stored on the DASD.

An open file operation directed to the first server S1 is indicated by the numeral "4" and opens the data file. This open is accomplished in conjunction with identifying information returned from the look-up operation. The open operation also retrieves metadata from the DASD and stores it in a new open control block for the data object File A in the first server S1 (numeral "5"). By examining load-balancing information, the first server S1 determines that byte range locking for File A can be performed by another byte file server. This can be determined, for example, by the server administrator of the first server. The first server then returns an open token to the first client C1 (indicated by numeral "6") and at the same time returns an indicator that byte range locking operations for File A have been off-loaded and those operations should be directed to the second server S2, which is designated as the task server for byte range locking. The precise structure of the indicator and name of the task server returned can take many forms and can be fashioned by those skilled in the art without further explanation. The first client C1 continues with a file read operation, indicated by numeral "7", passing the same open token, which causes the first server S1 to retrieve the requested data file from the DASD (indicated by numeral "8") and to return it to the first client C1 (indicated by numeral "9").

When the first client C1 has a need to lock File A, it sends a lock operation (indicated by the numeral "10") to the second server S2 instead of the first server S1. Note that S1 is the repository server and repository for the associated file and the second server is the task server for byte range locking. For the first lock of File A, the second server S2 goes to the first server S1 with a validate operation (indicated by number "11"). The validate operation indicates that File A has been opened by C1 and that permission has been obtained for the lock operation. This validation is a server-to-server operation that is appropriate only for the first such lock operation on File A by C1. The validation is recorded in the second server S2 so that is need not be repeated for other lock and unlock operations of the same scope. The second server S2 records the actual lock using a byte range lock manager (BRLM), indicated by the numeral "12", and responds to the first client (indicated by "13").

In the system configuration of the FIG. 8 embodiment, the second client C2 sends similar look-up operations, open operations, and the like (not illustrated) to the first server S1 for File A and similarly is told to use the second server S2 for lock operations. Accordingly, the second client C2 sends a lock operation to the second server S2 (indicated by "14"), where the operation is validated as before (indicated by "15") and is sent to the BRLM (indicated by "16"). If there is a lock conflict, the BRLM queues the lock behind the lock already recorded for C1.

The exemplary FIG. 8 configuration assumes C1 then unlocks in File A lock (as indicated by "17"). Because of previous validation recording in the second server S2, there is no need to repeat the validation step, so the unlock operation is passed directly to the BRLM (indicated by "18"), where it also causes the lock to be given to the second client C2, who is queued for it. C2 is notified by the BRLM through a "post" function (indicated by "19"), which generates a response to C2 (indicated by "20"). A response to the current unlock operation also is sent to the first client (indicated by "21").

When the first client C1 closes File A, indicated by "22", an invalidate operation (indicated by "23") is sent by the first server S1 to the second server S2 so the second server will know that the file is no longer open, require a validation for the next lock operation, and free any locks still held by C1 for File A. A response to the close operation is sent to C1, as indicated by "24".

It should be clear that similarities exist between the byte range lock off-loading described immediately above and the named pipe illustration described previously. In both cases, there are some operations that are appropriately retained in the repository server, while other operations can be off-loaded to another server because of minimal operational independence from object definition, potential for frequent occurrences, and generally minimal data transfer. Also, there may be initial open and close related operations that require occasional server-to-server communications, mostly for security or data integrity validation. Such issues will be known and can be handled by those skilled in the art without further explanation.

Other considerations may lead to alternative features for the processors described above in conjunction with the byte filer server 106 of the preferred embodiment illustrated in FIG. 1. For example, it might be desired to dynamically determine the operations that will be off-loaded, or transferred to an alternative server. In particular, it can advantageous for the server administrator process to determine the operations that will be off-loaded in response to the load of the server. Such a design, for example, might entail off-loading pipe operations up to a first predetermined operating load of the server, as determined by collected system operating statistics, and might entail off-loading byte range locking operations if such statistics indicate that the server has reached a second predetermined operating load. Further, a byte file server might incorporate a staged partitioning in which only named pipe operations are off-loaded up to a first operating load and both pipe operations and bye range locking operations are off-loaded from the first operating load to a second operating load.

The process of performing the steps described above in connection with the drawings and the pseudo code may be performed by the system elements illustrated in FIG. 1 comprising the client environments 102, 104 and the server 106 by executing a series of computer-readable instructions contained on a data storage medium, such as a program product storage device 99, that can be read by the respective system elements. The program product storage device may comprise, for example, a recordable medium such as a floppy disk on which the instructions are recorded. These instructions may instead be tangibly embodied on another DASD (not shown), a magnetic tape, a conventional hard disk drive, electronic read-only memory, optical storage device, set of paper "punch" cards, or other forms of non-volatile data storage as will be understood by those skilled in the art. Alternatively, the instructions can be received by the server 106 and distributed to the client environments over the network 107.

The present invention has been described above in terms of a presently preferred embodiment so that an understanding of the present invention can be conveyed. There are, however, may configurations for file servers not specifically described herein but with which the present invention is applicable. The present invention should therefore not be seen as limited to the particular embodiment described herein, but rather, it should be understood that the present invention has wide applicability with respect to file servers generally. All modifications, variations, or equivalent arrangements that are within the scope of the attached claims should therefore be considered to be within the scope of the invention.

We claim:

1. A method of performing operations on objects in a distributed network computer processing system in which a plurality of server processors connected at network server nodes of the distributed computer processing system receive requests for performing the operations from client environments of the network, the method comprising the steps of:

receiving a client environment application process request at a client environment router for an operation on an object stored at a repository server of the system;

determining if the operation is in an off-load operation set of the repository server comprising operations to be performed at a task server of the system;

notifying the client environment of an identifier that identifies the task server at which the off-load operation set will be performed;

executing the operations of the off-load operation set in the identified task server; and maintaining object information in the repository server that defines the object that was affected by the requested operation.

2. A method as defined in claim 1, wherein the step of notifying occurs at the time of client environment connection to the repository server.

3. A method of defined in claim 1, further including the steps of:

storing the task server identifier in a local memory of the client environment; and sending the requested operation to the identified task server.

4. A method as defined in claim 1, wherein the step of determining comprises the steps of:
   sending the requested operation to the repository server at which the object is stored in response to an initial request for an operation on the object;
   identifying an off-load operation set to which the operation belongs;
   determining if the operation is one of the off-load operation set;
   notifying the client environment of an identifier that identifies the task server at which the off-load operation set will be performed; and
   storing the task server identifier in a local memory of the client environment.

5. A method as defined in claim 4, wherein the step of sending comprises the steps of:
   generating a set of server operations that implement the requested operation when performed; and
   sending the generated server operations to the identified task server.

6. A method as defined in claim 4, further including the step of:
   receiving requests from the client environment for operations that are in the off-load operation set;
   sending the received requests to the identified task server; and
   executing the operations of the off-load operation set in the identified task server.

7. A method as defined in claim 1, further including the step of:
   storing the object information in a local memory of the client environment.

8. A method as defined in claim 1, further including the step of sending predetermined inter-server operations between a task server and a repository server to obtain and maintain object information that is affected by the requested operations.

9. A method as defined as claim 1, wherein the off-load operation set comprises named pipe operations.

10. A method as defined in claim 1, wherein the off-load operation set includes byte range lock operations.

11. A method of performing operations on objects in a distributed network computer processing system in which a plurality of server processors receive requests for performing the operations from client environments of the network, the method comprising the steps of:
   (1) receiving a request from an application process of a client environment for performing an operation on an object stored at a repository server;
   (2) processing the request in a client router of the client environment and thereby generating a set of server operations that implement the requested operation when performed;
   (3) sending the generated server operations to the repository server at which the object is stored;
   (4) defining an off-load operation set of the repository server comprising a set of operations to be performed by a task server;
   (5) designating an off-loaded operation as one of the off-loan operation set;
   (6) notifying the client router of an identifier that identifies the task server at which the off-load operation set will be performed;
   (7) storing in a local memory of the client environment the task server identifier;
   (8) receiving requests at the client router from application processes for operations in the off-load operation set on objects that are stored at the repository server that notified the client router of the task server identifier;
   (9) processing the requests in the client router and thereby routing the generated server operations of the off-load set to the identified task server;
   (10) executing the server operations of the off-load operation set in the identified task server; and
   (11) routing predetermined inter-server operations between a task server and a repository server to obtain and maintain object information affected by an off-loaded operation executed by the task server.

12. A method as defined in claim 11, wherein the off-load operation set comprises named pipe operations.

13. A method as defined in claim 11, wherein the off-load operation set includes byte range lock operations.

14. A method as defined in claim 11, wherein the step of processing requests in the client router includes determining that the requested operation should be performed in the identified task server, in response to system loading measurements of a predetermined value.

15. A method as defined in claim 11, wherein the step of notifying the client router occurs when the requesting client environment makes an initial communications connection with the repository server.

16. A method as defined in claim 11, wherein the off-load operation set comprises a plurality of sets of predetermined data operations.

17. A method as defined in claim 16, wherein the sets of predetermined data operations are performed by more than one task server.

18. A method as defined in claim 17, wherein the step of identifying comprises identifying a task server at which each off-load operation set will be performed.

19. A method as defined in claim 17, wherein the step of notifying occurs when the requesting client makes an initial communications connection with the repository server.

20. A computer processing system comprising:
   a plurality of nodes connected by a network;
   a plurality of repository servers located at nodes of the network;
   at least one permanent storage device located at a repository server of the network at which objects are stored and specified by object information;
   at least one task server located at a node of the network;
   a plurality of client environments at nodes of the network, at least one of which includes an application process that generates requests for performing operations on the objects;
   a client environment router that sends the operation requests to the respective repository server at which the affected objects are stored on an initial request and receives an indication if the operation is a member of an off-load operation set of the repository server comprising operations to be performed at a task server of the system, in which case the router receives an identifier that identifies the task server at which the off-load operation set will be performed and then sends the operation requests directly to the identified task server for execution; and
   a repository server process that maintains object information that defines the object that was affected by the requested operation.

21. A system as defined in claim 20, wherein the client router stores the task server identifier in a local memory of the client environment.

22. A system as defined in claim 20, wherein the client environment router generates a set of server operations that implement the requested operation when performed and sends the generated server operations to the repository server at which the object is stored.

23. A system as defined in claim 20, wherein the client router stores the object information in a local memory of the client environment.

24. A system as defined in claim 20, wherein the repository server and task server send and receive predetermined inter-server operations to obtain and maintain object information affected by the requested operations.

25. A computer processing system comprising:
- a plurality of nodes connected by a network;
- a plurality of repository servers located at nodes of the network, at which objects are defined by object metadata information;
- an off-load decisions means for identifying a task server for an off-load operation set of predetermined operations that can be off-loaded;
- at least one permanent storage device located at a repository server of the network at which objects are stored and specified by the object metadata information;
- a plurality of client environments at nodes of the network, at least one of which includes an application process that generates requests for performing operation on the objects;
- an off-load notification means for notifying the client environment of a task server identifier that identifies the task server at which the off-load operation set will be performed;
- a client environment router that sends requested operations in the off-load operation set and the object metadata information to the task server identified by the task server identifier of which the client environment was notified; and
- at least one network task server, located at a node of the network, that receives the off-load operation request from the client environment router and executes the requested operation on the object specified by the object metadata information.

26. A system as defined in claim 25, further including:
- an inter-server operation means for obtaining and maintaining object metadata information affected by an off-loaded operation executed by the task server.

27. A system as defined in claim 25, wherein the off-load operation set comprises named pipe operations.

28. A system as defined in claim 25, wherein the off-load operation set includes byte range lock operations.

29. A system as defined in claim 25, wherein the client router determines when the requested operation should be performed in the repository server, in response to system loading measurement of a predetermined value.

30. A system as defined in claim 25, wherein the off-load notification means notifies the client environment router of the off-load operation set when the requesting client environment makes an initial communications connection with the repository server.

31. A system as defined in claim 25, wherein the off-load operation set comprises a plurality of sets of predetermined data operations.

32. A system as defined in claim 31, wherein the sets of predetermined data operations are performed by more than one task server.

33. A system as defined in claim 32, wherein the off-load notification means identifies a task server at which each off-load operation set will be performed.

34. A computer processing system comprising:
- a plurality of servers, each server having
  - (a) an administrative process;
  - (b) repository server functions;
  - (c) task server functions; and
  - (d) a permanent storage device containing objects on which operations will be performed;
- a plurality of client environments, each client environment having
  - (a) a client process that requests operations on the objects stored in the permanent storage device, and
  - (b) a local memory; and
- a network that connects the server and the client environments; wherein:
- one of the repository server functions locates object information, stored in the permanent storage device, that identifies the requested object, determines if the client request was for an operation comprising a predetermined off-loaded operation and, in response, returns to the client process a task server identifier that specifies a task server function of a server at which the requested data operation will be performed; and
- the requesting client environment sends the requested operation to the identified task server function, where the requested operation is performed.

35. A system as defined in claim 34, wherein the returned object information is stored in the local memory of the requesting client.

36. A system as defined in claim 34, wherein the object of the requested operation comprises a named pipe.

37. A system as defined in claim 34, wherein the predetermined off-loaded operation comprises a set of operations including byte range locking operations.

38. A system as defined in claim 34, wherein the object of the received request comprises a data file.

39. A program product data storage device, tangibly embodying a program of machine-readable instructions executable by a computer to perform method steps for operations on objects in a distributed network computer processing system in which a plurality of server processors connected at network server nodes of the distributed computer processing system receive requests for performing the operations from client environments of the network, the method steps performed by the computer comprising the steps of:
- receiving a client environment application process request at a client environment router for an operation for an object stored at a repository server of the system;
- determining if the operation is in an off-load operation set of the repository server comprising operations to be performed at a task server of the system;
- notifying the client environment of an identifier that identifies the task server at which the off-load operation set will be performed;
- executing the operations of the off-load operation set in the identified task server; and
- maintaining object information in the repository server that defines the object that was affected by the requested operation.

40. A program product as defined in claim 39, wherein the step of notifying occurs at the time of client environment connection to the repository server.

41. A program product as defined in claim 39, further including the steps of:

storing the task server identifier in a local memory of the client environment; and sending the requested operation to the identified task server.

42. A program product as defined in claim 39, wherein the step of determining comprises the steps of:

sending the requested operation to the repository server at which the object is stored in response to an initial request for an operation on the object;

identifying an off-load operation set to which the operation belongs;

determining if the operation is one of the off-load operation set;

notifying the client environment of an identifier that identifies the task server at which the off-load operation set will be performed; and storing the task server identifier in a local memory of the client environment.

43. A program product as defined in claim 42, wherein the step of sending comprises the steps of:

generating a set of server operations that implement the requested operation when performed; and sending the generated server operations to the primary/repository server at which the object is stored.

44. A program product as defined in claim 42, further including the steps of:

receiving requests from the client environment for operations that are in the off-load operation set;

sending the received requests to the identified task server; and executing the operations of the off-load operation set in the identified task server.

45. A program product as defined in claim 39, wherein the step of notifying comprises storing the object information in a local memory of the client environment.

46. A program product as defined in claim 39, further including the step of sending predetermined inter-server operations between a task server and a repository server to obtain and maintain object information affect by the requested operations.

47. A program product as defined in claim 39, wherein the off-load operation set comprises named pipe operations.

48. A program product as defined in claim 39, wherein the off-load operation set includes byte range lock operations.

\* \* \* \* \*

UNITED STATES PATENT AND TRADEMARK OFFICE
CERTIFICATE OF CORRECTION

PATENT NO.        : 6,275,867 B1                                          Page 1 of 1
APPLICATION NO.   : 08/527148
DATED             : August 14, 2001
INVENTOR(S)       : Edward J. Bendert et al.

It is certified that error appears in the above-identified patent and that said Letters Patent is hereby corrected as shown below:

Please remove James D. Cashman, Paul M. Riley, Raymond G. Bahr, Wei Ye and Grant Grummer as Applicants because they were erroneously listed on the issue notification. The correct Applicants are Edward J. Bendert (Vestal, NY), Robert B. Bennett (Endwell, NY), Eugene Johnson (Vestal, NY) & Robert M. Nugent (Nichols, NY)

Signed and Sealed this

Twenty-third Day of November, 2010

David J. Kappos
*Director of the United States Patent and Trademark Office*